United States Patent
Liu et al.

(10) Patent No.: US 9,760,653 B2
(45) Date of Patent: Sep. 12, 2017

(54) MAPPING NON-GENERIC MARKUP LANGUAGE ELEMENTS TO GENERIC OBJECT-ORIENTED PROGRAMMING LANGUAGE OBJECTS

(71) Applicant: International Business Machines Corporation, Armonk, NY (US)

(72) Inventors: Pu Liu, Vestal, NY (US); William F. Phillips, Endicott, NY (US); Timothy M. Sexton, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 36 days.

(21) Appl. No.: 15/070,044

(22) Filed: Mar. 15, 2016

(65) Prior Publication Data

US 2017/0091341 A1    Mar. 30, 2017

Related U.S. Application Data

(63) Continuation of application No. 14/870,637, filed on Sep. 30, 2015.

(51) Int. Cl.
*G06F 9/44* (2006.01)
*G06F 9/45* (2006.01)
*G06F 17/30* (2006.01)
*G06F 17/27* (2006.01)

(52) U.S. Cl.
CPC ........ *G06F 17/30914* (2013.01); *G06F 8/315* (2013.01); *G06F 17/272* (2013.01)

(58) Field of Classification Search
CPC ........ G06Q 10/06; G06Q 99/00; H04L 67/02; H04L 67/20; G06F 11/3624; G06F 11/3636; G06F 17/30914; G06F 8/34; G06F 8/10; G06F 8/52
See application file for complete search history.

(56) References Cited

U.S. PATENT DOCUMENTS

| | | | |
|---|---|---|---|
| 6,684,222 B1 * | 1/2004 | Cornelius | G06F 17/3061 |
| 6,918,107 B2 * | 7/2005 | Lucas | G06F 8/34 |
| | | | 717/114 |
| 6,981,211 B1 * | 12/2005 | Claussen | G06F 17/30914 |
| | | | 707/E17.012 |
| 7,194,485 B2 | 3/2007 | Kaipa et al. | |
| 7,526,490 B2 | 4/2009 | Doughan | |

(Continued)

OTHER PUBLICATIONS

Jarada et al., Mapping rules for converting from ODL to XML schemas, Nov. 2010, 8 pages.*

(Continued)

*Primary Examiner* — Thuy Dao
(74) *Attorney, Agent, or Firm* — David B. Woycechowsky

(57) ABSTRACT

A system extends functionality of Java architecture for XML (extensible markup language) binding, (JAXB). Represents non-generic elements of a markup language (for example, XML) document in an object oriented programming language (for example, Java). The elements are represented as objects in the programming language. Objects are changed in the programming language representation and the original markup language document is then updated with updated objects translated back as updated elements of the document. The entire document infoset is preserved.

1 Claim, 4 Drawing Sheets

(56) References Cited

U.S. PATENT DOCUMENTS

| | | | |
|---|---|---|---|
| 7,650,591 | B2 | 1/2010 | Bau |
| 7,698,684 | B2 | 4/2010 | Baikov |
| 7,793,255 | B1 | 9/2010 | Kawaguchi et al. |
| 7,962,925 | B2 | 6/2011 | Fry et al. |
| 8,015,541 | B1* | 9/2011 | Srinivasan ................ G06F 8/20 717/104 |
| 8,145,608 | B2* | 3/2012 | Kunti ................ G06F 17/30914 707/694 |
| 2003/0110446 | A1 | 6/2003 | Nemer |
| 2004/0015840 | A1 | 1/2004 | Walker |
| 2005/0273703 | A1 | 12/2005 | Doughan |
| 2006/0075387 | A1* | 4/2006 | Martin ....................... G06F 8/34 717/124 |
| 2007/0083543 | A1* | 4/2007 | Chen ................. G06F 17/30604 |
| 2007/0143330 | A1 | 6/2007 | Tang |
| 2013/0086134 | A1 | 4/2013 | Doughan et al. |

OTHER PUBLICATIONS

Jiang et al., Mapping-driven XML transformation, May 2007, 10 pages.*

"Extensible Markup Language (XML) 1.0 (Fifth Edition)", W3C Recommendation Nov. 26, 2008, modified Feb. 7, 2013, 64 pages, <http://www.w3.org/TR/REC-xml/>.

"Java Architecture for XML Binding", Wikipedia, the free encyclopedia, page last modified on Apr. 2, 2015, at 12:51, 5 pages, <https://en.wikipedia.org/wiki/Java_Architecture_for_XML_Binding>.

Liu et al., "Mapping Non-Generic Markup Language Elements to Generic Object-Oriented Programming Language Objects", U.S. Appl. No. 14/870,637, filed Sep. 30, 2015, 23 pages.

Appendix P—List of IBM Patents and Patent Applications Treated as Related, 2 pages.

* cited by examiner

MAPPING NON-GENERIC MARKUP LANGUAGE ELEMENTS TO GENERIC OBJECT-ORIENTED PROGRAMMING LANGUAGE OBJECTS

BACKGROUND

The present invention relates generally to the field of mapping markup language content to "objects" (that is, a location in memory having a value and typically referenced by an identifier).

XML, which stands for eXtensible Markup Language, is a markup language. Typically, XML documents are machine-readable, and also typically reasonably human-readable. An XML infoset typically includes all the information contained within the XML file including spacing, comments, elements, attributes, and data. While all of the machine-readable information typically remains within elements and element attributes, valid XML may still have comments which can make the files more human-readable. An XML Schema is a way to describe a certain type of XML document. The XML Schema acts as a set of constraints that an XML document can be validated against. The process of validating an XML document against an XML Schema is separate from the XML document being well-formed. A well-formed XML document conforms to all the rules of XML. Typically, well-formed XML documents can be validated against some XML Schema when the XML Schema is specific enough.

SUMMARY

According to an aspect of the present invention, there is a method, computer program product and/or system that performs the following operations (not necessarily in the following order): (i) receiving (a) a first information dataset in the form of a markup language file, the first information dataset including a first plurality of related element nodes, and (b) a set of change(s) to be made to the first information dataset; (ii) generating (a) a first plurality of related objects, in an object oriented programming language, corresponding to the first plurality of related element nodes, and (b) a set of link information that links the objects of the first plurality of related objects to respectively corresponding element nodes in the first plurality of related element nodes; (iii) making the set of change(s) to the first plurality of related objects using the object oriented programming language to create a revised first plurality of related objects; and (iv) making the set of change(s) to the first plurality of related nodes, in the markup language file, based on the revised first plurality of related objects and the set of link information.

DETAILED DESCRIPTION

Figure 1:
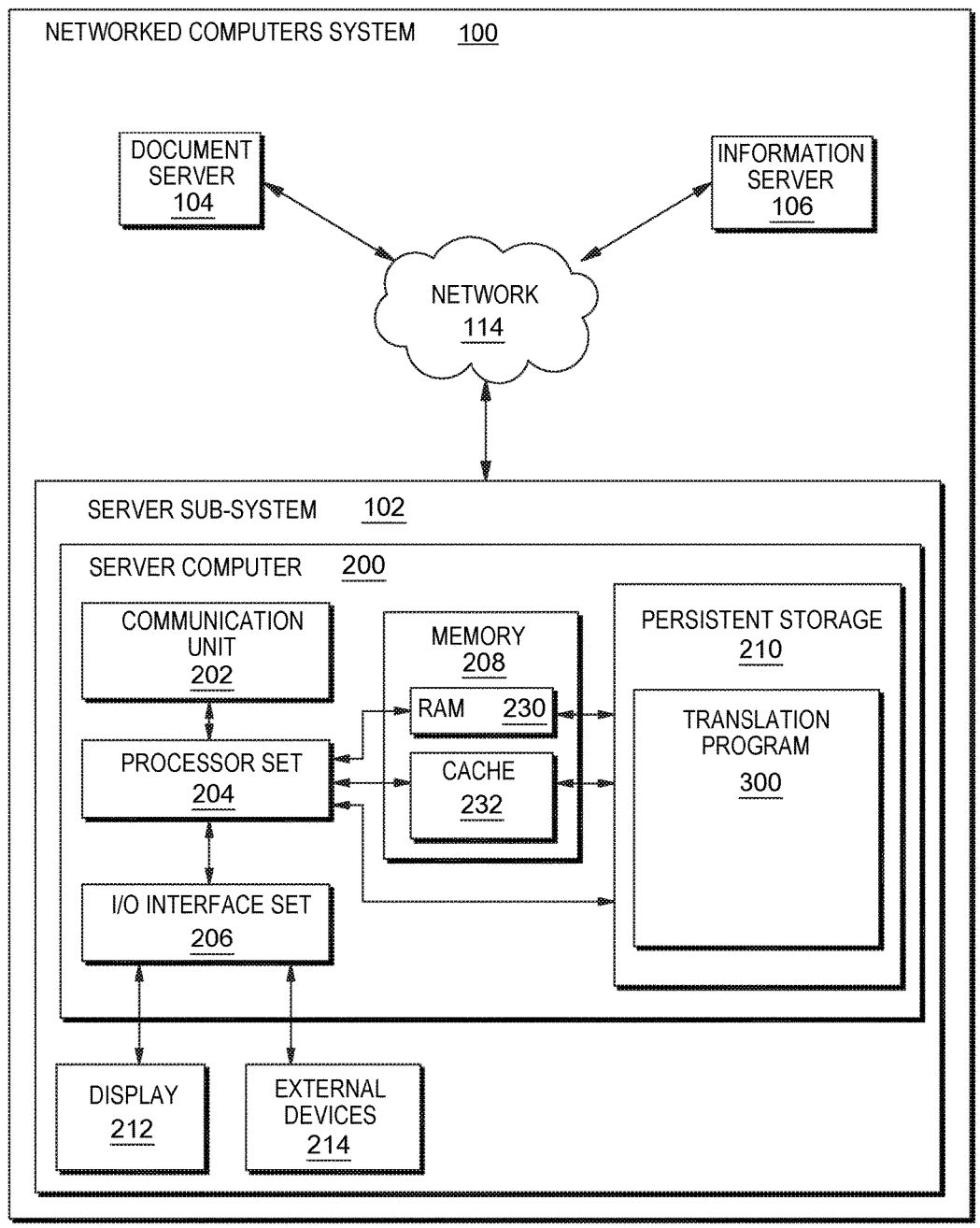
FIG. 1 is a block diagram view of a first embodiment of a system according to the present invention.

A markup language (for example, XML) document is parsed, in an object oriented programming language (for example, Java), into document object model (DOM) nodes. The document is unmarshaled (for example, by calling Java architecture for XML binding, (JAXB) on the root element). Java objects are used to represent non-generic XML elements. Each DOM node is associated with a Java object so as to preserve the mapping of DOM nodes to the document. The XML document is preserved otherwise. Extends functionality of JAXB, gives greater ability to use object-oriented design principles, and provides greater flexibility when mapping XML elements to Java objects. This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; document server 104; information server 106; communication network 114; server computer 200; communication unit 202; processor set 204; input/output (I/O) interface set 206; memory device 208; persistent storage device 210; display device 212; external device set 214; random access memory (RAM) devices 230; cache memory device 232; and translation program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Translation program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Translation program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Translation program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, translation program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENT

Figure 2:
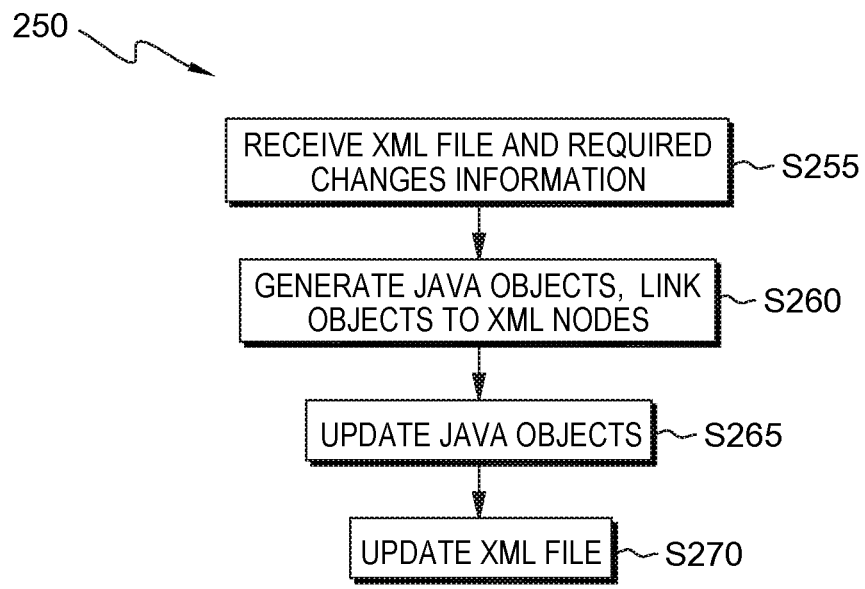
FIG. 2 is a flowchart showing a first embodiment method performed, at least in part, by the first embodiment system.
Figure 3:
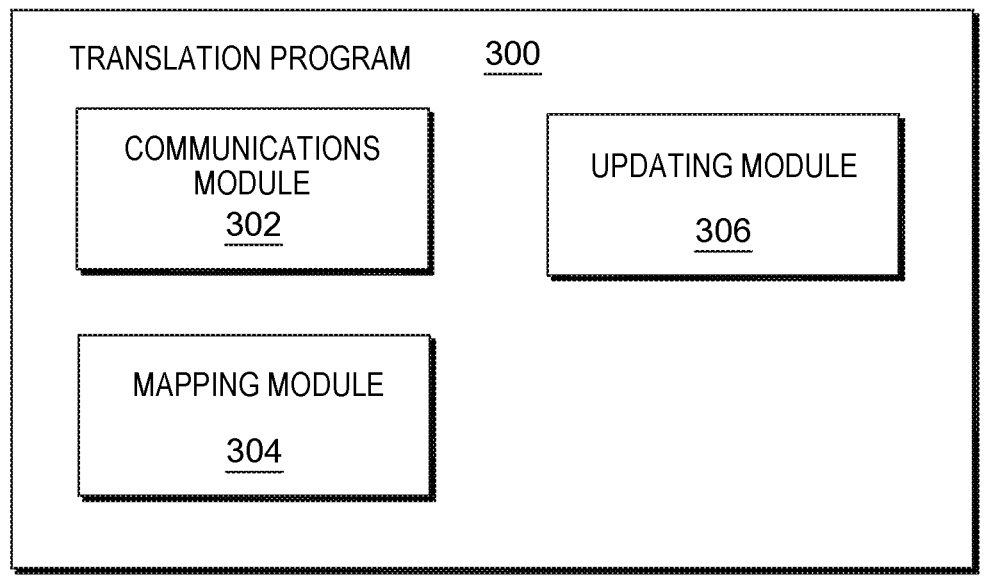
FIG. 3 is a block diagram showing a machine logic (for example, software) portion of the first embodiment system.

FIG. 2 shows flowchart 250 depicting a method according to the present invention. FIG. 3 shows translation program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where communications module ("mod") 302, of translation program 300, receives an original XML infoset (not separately shown in the figures) from document server 104 of FIG. 1, and further receives a required update data set (not separately shown in the figures) from information server 106 of FIG. 1. The required update data set includes information pertaining to data, included in the XML infoset, that are to be updated. In some embodiments, the required update data set is determined programmatically. In some embodiments, the update data set includes information derived from: (i) real-time sensor data; (ii) telemetry data transmitted from moving vehicles; (iii) automobile traffic data derived from camera images and roadway sensor data; (iv) air traffic control data derived from radar and other telemetry data; (v) medical data; (vi) research data; (vii) cellphone network data; (viii) commodity pricing data; (ix) crime data; and/or (x) any other type of data that can be included in an XML-type file.

Processing proceeds to operation S260, where mapping module 304, of translation program 300, parses data in the XML file and creates respective JAVA objects where any type of XML node can be represented as any type of JAVA object in a way that preserves the mapping back to the original XML document. Each node in the XML infoset is mapped to a Java object. The interrelationships between the JAVA objects correspond to the interrelationships between the nodes in the XML infoset such that there is a one-to-one correspondence between JAVA objects and XML nodes. Module 304 further dynamically links each JAVA object to its respective XML node.

Processing proceeds to operation S265, where updating module 306, of translation program 300, updates some of the JAVA objects in accordance with the required update data set.

Processing proceeds to operation S270 where communications module 302, of translation program 300, updates the XML infoset in accordance with the updated JAVA objects, such that the updates indicated in the required update data set are applied to the original XML infoset.

III. FURTHER COMMENTS AND/OR EMBODIMENTS

Some embodiments of the present invention may include one, or more, of the following features, characteristics and/or advantages: (i) map non-generic XML (extensible markup language) elements to generic Java objects (note: the term "JAVA" may be subject to statutory and/or common law trademark protection in various jurisdictions throughout the world); (ii) handles situations where there are XML documents which do not correspond to a stable XML Schema but it is desired to be able to manipulate the elements of the XML document as Java objects and then apply our updates back to the original XML file without losing the infoset; (iii) provides a tool which allows for this type of XML element to have performed on it Java object binding of elements if the elements do not share a common name; (iv) allows XML element mapping in a way that does not involve writing new code every time the schema or XML changes; and/or (v) relatively non-error-prone.

Some embodiments of the present invention may include one, or more, of the following features, characteristics and/or advantages: (i) allows for someone to manipulate all XML element nodes, including non-generic named XML elements, as any types of generic Java objects and then apply the changes back to an XML file by creating a dynamic association of the child element XML nodes of an element to the parent element; (ii) unlike in JAXB (Java Architecture for XML Binding) where all XML element names must correspond to a class, allows for any XML node to be created as any kind of Java object in a way that preserves the mapping back to the original XML document; and/or (iii) leads to simpler and/or more abstract ways to handle XML data as Java objects without losing information from the XML document.

In one embodiment of a method according to the present disclosure: (i) receive a well-formed XML document; (ii) parse the document in Java into DOM (document object model) nodes; (iii) call the JAXB binder on the root element to unmarshal the document; and (iv) map any other elements using either the existing JAXB annotation methods or methods according to the present disclosure throughout the document. Normally, with annotated classes for each XML element, operation (iii), above, would be the last step before modifying the document. Here, in this method embodiment, there are not annotated classes. Instead, a Java object is created, and can be used to represent non-generic XML elements. Through this method embodiment, each DOM node is associated to the Java object that was created in a way that preserves the mapping of DOM nodes to the document. A potential advantage to using the JAXB binder is that all changes are made in a way such that the XML document is preserved. This method embodiment provides extended functionality on the JAXB binder, giving greater ability to use Object-Oriented design principles and providing more flexibility when doing the mapping of the XML elements to Java objects.

Consider the following example XML document:
```
<?xml version="1.0" encoding="utf-8" standalone="yes"?>
<root_element attribute_1="text" attribute2="text">
<!--COMMENT-->
<!--Another Comment-->
<type><!--comment-->
  <PREFIX_DEF><!--comment-->
    <a attribute_a="lorem" attribute_b="ipsum"/><!--comment-->
    <a attribute_a="dolor" attribute_b="sit"/><!--comment-->
  </PREFIX_DEF>
  <PREFIX_GHI>
    <a attribute_a="amet" attribute_b="consetetur"/><!--comment-->
    <a attribute_a="sadipscing" attribute_b="elitr"/>
    <a attribute_a="sed" attribute_b="diam"/><!--comment-->
  </PREFIX_GHI>
  <PREFIX_ABC>
    <a attribute_a="nonumy" attribute_b="eirmod"/>
  </PREFIX_ABC>
</type>
```

The above XML document has a human-readable pattern with comments sprinkled throughout. While this XML may not be ideal in terms of design it still conforms to all the rules of XML to make it valid. In this example, it is desired to manipulate all of the "a" elements Java objects and to apply the changes back to this original XML document. Programmatically, in this example, the logical approach to this would be to manipulate each "a" element's attributes where each "a" element could be accessed through its parent element. In this case, all parent elements have a common prefix but the element names are all different. Under current versions of JAXB this becomes an issue. Specifically, in JAXB, the following Java classes would be required:
type.class
PREFIX_DEF.class
PREFIX_GHI.class
PREFIX_ABC.class
a.class Some embodiments of the present invention avoid the issue of having a unique class for every single PREFIX_*** element. Needing to modify the code every time there is a new tag is a clumsy solution that takes a lot of unnecessary time and is very error prone. A programmatic solution, is to allow for the following: every child element of a given XML element, including the root element, can be associated to a specified Java object, with the mapping to the XML node preserved.

A method according to the present disclosure includes the following operations: (i) the callback function is registered to be invoked when the specified element is being parsed (the specific element could be either annotated as @XmlAnyElement or an XML XPath); (ii) an interface which defines the conversion from any non-specific XML node to a specific Java object and vice versa; (iii) the internal map between the abstract XML node and the Java Object; (iv) once the callback function is invoked, it will traverse the element and calls the interface to create the concrete Java object; (v) the newly created Java object is then put into the internal map; (vi) the users finish updating the Java object; and (vii) the internal map is used to update the abstract XML node which is used to generate the final XML file.

In the method of the preceding paragraph, there are only the following classes:
type.class
PREFIX.class
a.class
In this method, any update to the XML file or schema which involves adding another element under type does not require any change to our code.

Figure 4:
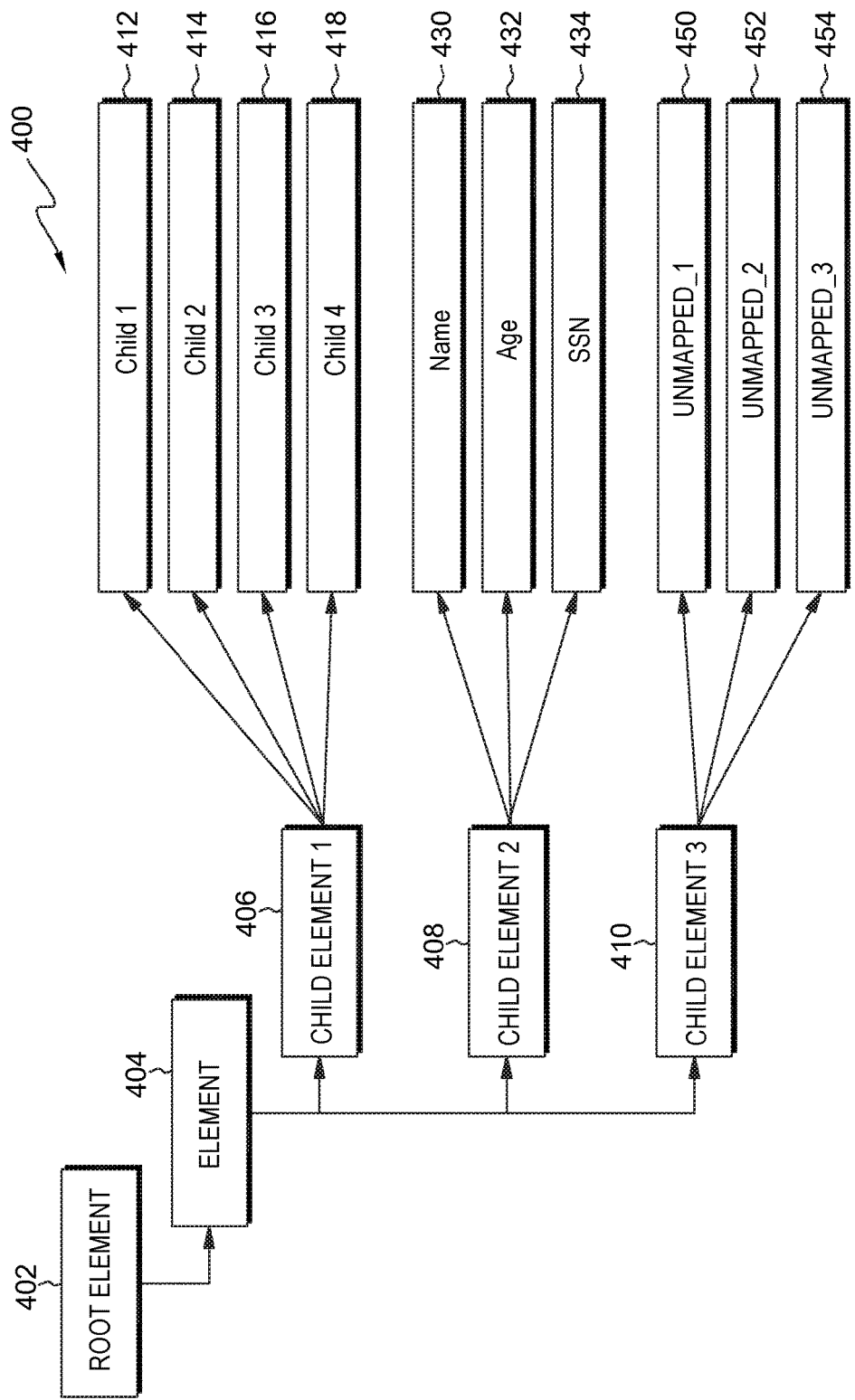
FIG. 4 is a tree diagram showing information that is helpful in understanding embodiments of the present invention.
Figure 5:
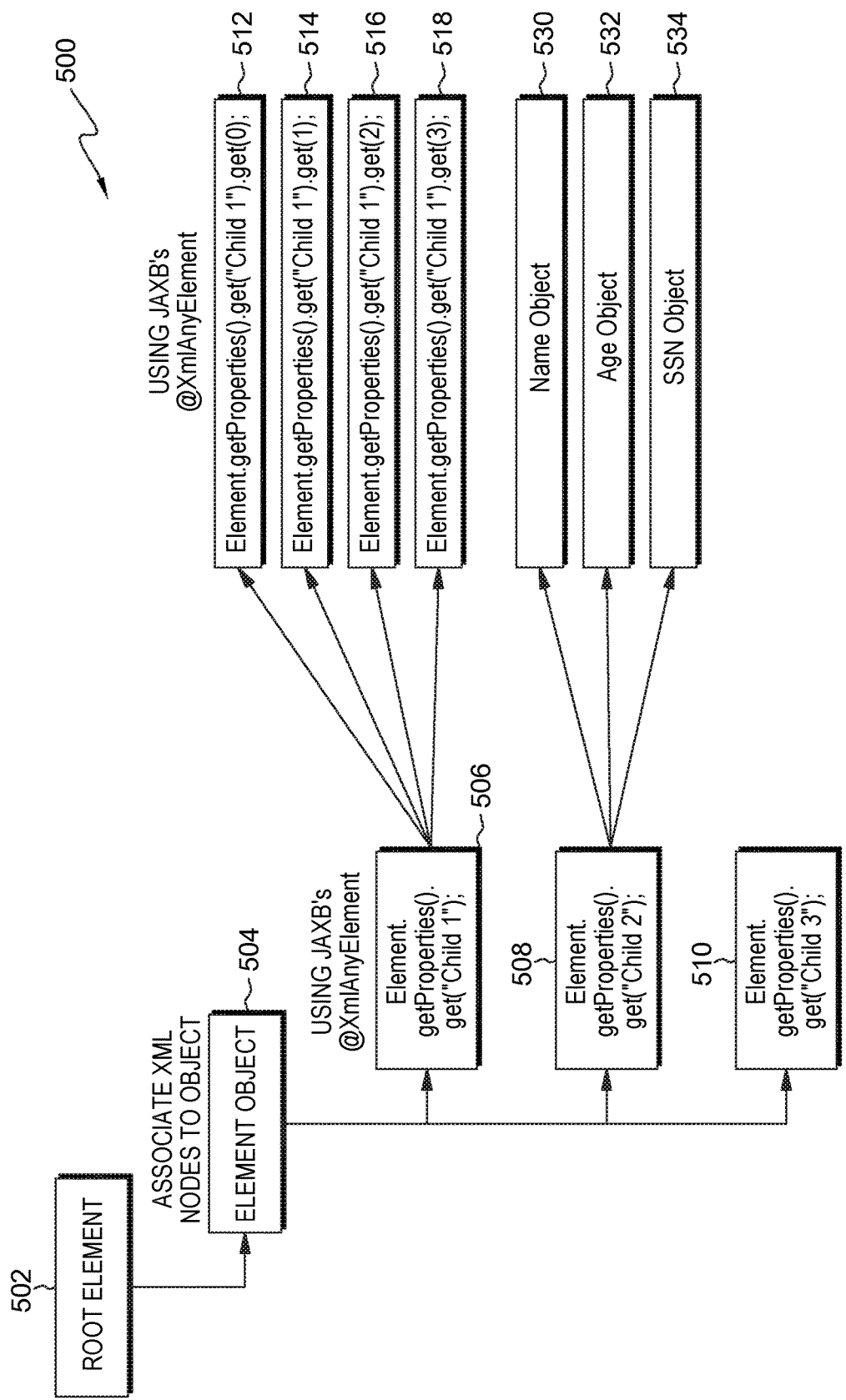
FIG. 5 is a tree diagram showing information that is helpful in understanding embodiments of the present invention.

As shown in FIG. 4, XML layout diagram 400 includes: root element 402; element 404; child element_1 406; child element_2 408; child element_3 410; child_1 412; child_2 414; child_3 416; child_4 418; name 430; age 432; SSN 434; unmapped_1 450; unmapped_2 452; and unmapped_3 454. Elements of the XML layout diagram are organized in a tree structure.

Based on the XML layout diagram 400, the above-described methods achieve Java representation diagram 500, which includes: root object 502; element object 504; method getProperties( ) 506; method getProperties( ) 508; method getProperties( ) 510; method getProperties( ) 512; method getProperties( ) 514; method getProperties( ) 516; method getProperties( ) 518; name object 530; age object 532; and SSN object 534. Objects of the Java representation diagram are organized in a tree structure analogous to elements in XML layout diagram 400.

Diagram 400 shows the tree structure of an XML document. Diagram 500 shows the corresponding Java object hierarchy achieved by methods according to the present disclosure.

IV. DEFINITIONS

XML infoset/infoset: An XML information set. The entire contents of an XML file including: (i) the document information item (always present); (ii) element information items; (iii) attribute information items; (iv) processing instruction information items; (v) unexpanded entity reference information items; (vi) character information items; (vii) comment information items; (viii) the document type declaration information item; (ix) unparsed entity information items; (x) notation information items; and/or (xi) namespace information items.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-executed method comprising:
   receiving:
      a first information dataset in the form of a markup language file, the first information dataset including a first parent node and a first plurality of related element nodes, and
      a set of change(s) to be made to the first information dataset;
   generating:
      a first plurality of related objects, in an object oriented programming language, corresponding to the first plurality of related element nodes, and
      a set of link information that links the objects of the first plurality of related objects to respectively corresponding element nodes in the first plurality of related element nodes;
   making the set of change(s) to the first plurality of related objects using the object oriented programming language to create a revised first plurality of related objects;
   making the set of change(s) to the first plurality of related nodes, in the markup language file, based on the revised first plurality of related objects and the set of link information;
   mapping a non-generic element of the markup language file to an object in a generic object-oriented programming language;
   parsing the markup language file into at least one document object model node;
   associating a document object model node to a generic programming language object; and
   preserving mapping of a document object node to an element of the markup language file.

* * * * *